US012322304B2

(12) United States Patent
Canedy

(10) Patent No.: US 12,322,304 B2
(45) Date of Patent: Jun. 3, 2025

(54) ILLUMINATED VEHICLE DISPLAY DEVICE

(71) Applicant: Thomas Canedy, Radcliff, KY (US)

(72) Inventor: Thomas Canedy, Radcliff, KY (US)

( * ) Notice: Subject to any disclaimer, the term of this patent is extended or adjusted under 35 U.S.C. 154(b) by 144 days.

(21) Appl. No.: 18/152,275

(22) Filed: Jan. 10, 2023

(65) Prior Publication Data

US 2023/0267858 A1 Aug. 24, 2023

Related U.S. Application Data

(60) Provisional application No. 63/312,196, filed on Feb. 21, 2022.

(51) Int. Cl.

| | |
|---|---|
| ***G09F 13/00*** | (2006.01) |
| ***F21L 4/08*** | (2006.01) |
| ***G09F 13/22*** | (2006.01) |
| ***G09F 21/04*** | (2006.01) |
| ***H05B 47/11*** | (2020.01) |
| ***H05B 47/115*** | (2020.01) |
| *F21W 104/00* | (2018.01) |

(52) U.S. Cl.

CPC .............. *G09F 21/048* (2013.01); *F21L 4/08* (2013.01); *G09F 13/005* (2013.01); *G09F 13/22* (2013.01); *H05B 47/11* (2020.01); *H05B 47/115* (2020.01); *F21W 2104/00* (2018.01); *G09F 2013/222* (2013.01); *G09F 2013/227* (2013.01)

(58) Field of Classification Search

CPC ...... G09F 21/048; G09F 13/005; G09F 13/22; G09F 2013/222; G09F 2013/227; G09F 21/04; G09F 13/044; F21L 4/08; H05B 47/11; H05B 47/115; F21W 2104/00

See application file for complete search history.

(56) References Cited

U.S. PATENT DOCUMENTS

| | | | | |
|---|---|---|---|---|
| D340,203 S * | 10/1993 | Popp | ............................ | D11/165 |
| 6,104,313 A * | 8/2000 | Boyd, II | .................... | E01F 9/65<br>340/925 |
| 2003/0167666 A1* | 9/2003 | Close, Jr. | .................. | G09F 9/33<br>40/452 |
| 2004/0216343 A1* | 11/2004 | Golding | .................. | G09F 13/04<br>40/564 |
| 2006/0103638 A1* | 5/2006 | Podd | ........................ | B60Q 1/50<br>345/204 |
| 2015/0101222 A1* | 4/2015 | Hochfelsen | ............... | G09F 7/18<br>40/541 |
| 2017/0323591 A1* | 11/2017 | Siminoff | ............... | G09F 13/005 |
| 2019/0206289 A1* | 7/2019 | St. John | ................. | B60Q 1/503 |
| 2023/0394999 A1* | 12/2023 | Brooker | ............... | H05K 5/0247 |

* cited by examiner

*Primary Examiner* — Cassandra Davis

(74) *Attorney, Agent, or Firm* — Brennan, Manna & Diamond, LLC

(57) ABSTRACT

The present invention relates generally to the field of displaying devices for vehicles. More specifically, the present invention relates to an illuminated vehicle display device primarily comprised of a top cover, a circuit board, a bottom cover, and a housing with at least one solar panel. The device can be attached via at least one fastener to the interior surface of a vehicle window, wherein the circuit board has at least one LED that is powered by a solar panel which illuminates the top cover. In differing embodiments, the top cover may have a plurality of indicia such as, but not limited to: patterns, logos, emblems, images, symbols, designs, letters, numbers, words, characters, animals, advertisements, brands, etc. and may further be shaped like said indicia.

18 Claims, 3 Drawing Sheets

ILLUMINATED VEHICLE DISPLAY DEVICE

CROSS-REFERENCE TO RELATED APPLICATION

The present application claims priority to, and the benefit of, U.S. Provisional Application No. 63/312,196, which was filed on Feb. 21, 2022, and is incorporated herein by reference in its entirety.

FIELD OF THE INVENTION

The present invention relates generally to the field of display devices for vehicles. More specifically, the present invention relates to an illuminated vehicle display device primarily comprised of a top cover, a circuit board, a bottom cover and a housing with at least one solar panel. The display device can be attached to the interior surface of a vehicle window via at least one fastener, wherein the circuit board comprises at least one LED that is powered by the solar panel to illuminate the top cover. In differing embodiments, the top cover may have or be in the form of a plurality of different indicia such as, but not limited to, patterns, logos, emblems, images, symbols, designs, letters, numbers, words, characters, animals, advertisements, brands, etc. Accordingly, the present disclosure makes specific reference thereto. Nonetheless, it is to be appreciated that aspects of the present invention are also equally applicable to other like applications, devices and methods of manufacture.

BACKGROUND

Fans, alumni, and members of schools, colleges, fraternities, sororities, and other associations or groups may enjoy displaying their love and pride for their alma mater, favorite sports teams, group, organization or more. To do so, many individuals may use vehicle accessories, such as vinyl decals or bumper stickers. However, decals and bumper stickers are susceptible to peeling and fading as a result of consistent exposure to weather. Furthermore, decals and bumper stickers are not visible at night, which is undesirable and defeats the purpose of displaying the decals and bumper stickers.

Therefore, there exists a long-felt need in the art for a device that overcomes the inefficiencies and limitations of bumper stickers and decals for vehicles. There also exists a long-felt need in the art for an illuminated vehicle display device that is not susceptible to peeling and fading. Further, there exists a long-felt need in the art for an illuminated vehicle display device that is adequately illuminated at night. Finally, there is a long-felt need in the art for an illuminated vehicle display device that is relatively inexpensive to manufacture and that is both safe and easy to use.

The subject matter disclosed and claimed herein, in one embodiment thereof, comprises an illuminated vehicle display device. The display device is primarily comprised of a top cover, a circuit board, a bottom cover and a housing with at least one solar panel. The display device can be attached via at least one fastener to the interior surface of a vehicle window, wherein the circuit board has at least one LED that is powered by the solar panel for illuminating the top cover. In differing embodiments, the top cover may have a plurality of indicia such as, but not limited to, patterns, logos, emblems, images, symbols, designs, letters, numbers, words, characters, animals, advertisements, brands, etc., and may further be shaped like said indicia.

In this manner, the illuminated vehicle display device of the present invention accomplishes all of the forgoing objectives and provides a device that overcomes the inefficiencies and limitations of bumper stickers and decals for vehicles. Further, the display device is not susceptible to peeling and fading, and is adequately illuminated at night.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an illuminated vehicle display device primarily comprised of a top cover, a circuit board, a bottom cover, and a housing having at least one solar panel. In the preferred embodiment of the display device, the top cover, bottom cover and housing are manufactured from a heat and cold resistant, rigid plastic, and may be any color in the art, as well as being transparent, translucent or opaque. In addition, the top cover, bottom cover, and housing may be comprised of a plurality of indicia such as, but not limited to, patterns, logos, emblems, images, symbols, designs, letters, numbers, words, characters, animals, advertisements, brands, etc., and may further be shaped like said indicia. The top cover is further comprised of a top surface (that may feature said indicia) and a side surface. The top surface is further comprised of at least one fastener that allows the device to be easily secured to the interior of a vehicle window or anywhere else along the vehicle.

The bottom cover is further comprised of a bottom surface and a side surface. In differing embodiments, the top cover may fit over the bottom cover or may fit within the bottom cover. The top cover may be secured to the bottom cover via at least one fastener. At least one circuit board is located between the top cover and the bottom cover, and is further comprised of at least one processor and at least one LED light. The LED light illuminates through the top cover in order to illuminate the display device during use.

The device is further comprised of a housing that is preferably located to the side of the top cover and the bottom cover. The top surface of the housing is comprised of at least one solar panel that charges during daylight hours, and provides power to at least one battery to illuminate the LED light upon demand or in low light conditions. The top surface of the housing is further comprised of at least one sensor that is protected by a transparent housing, wherein the sensor is in electrical communication with the processor and can perceive the absence of light (i.e., night time) and/or motion. Once the absence of light and/or motion is detected, the sensor communicates with the processor to illuminate the LED light. When motion is continuously detected, the LED will remain illuminated. However, once motion is not detected for a user-specified period of time, the LED will no longer illuminate. This process can further be started (and subsequently automated) by pressing at least one button that is preferably located on the bottom surface of the bottom cover and/or housing.

Accordingly, the illuminated vehicle display device of the present invention is particularly advantageous as it provides a device that overcomes the inefficiencies and limitations of bumper stickers and decals for vehicles, and that is not susceptible to peeling and fading. In addition, the display device is adequately illuminated at night. In this manner, the illuminated vehicle display device overcomes the limitations of existing bumper stickers and decals known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
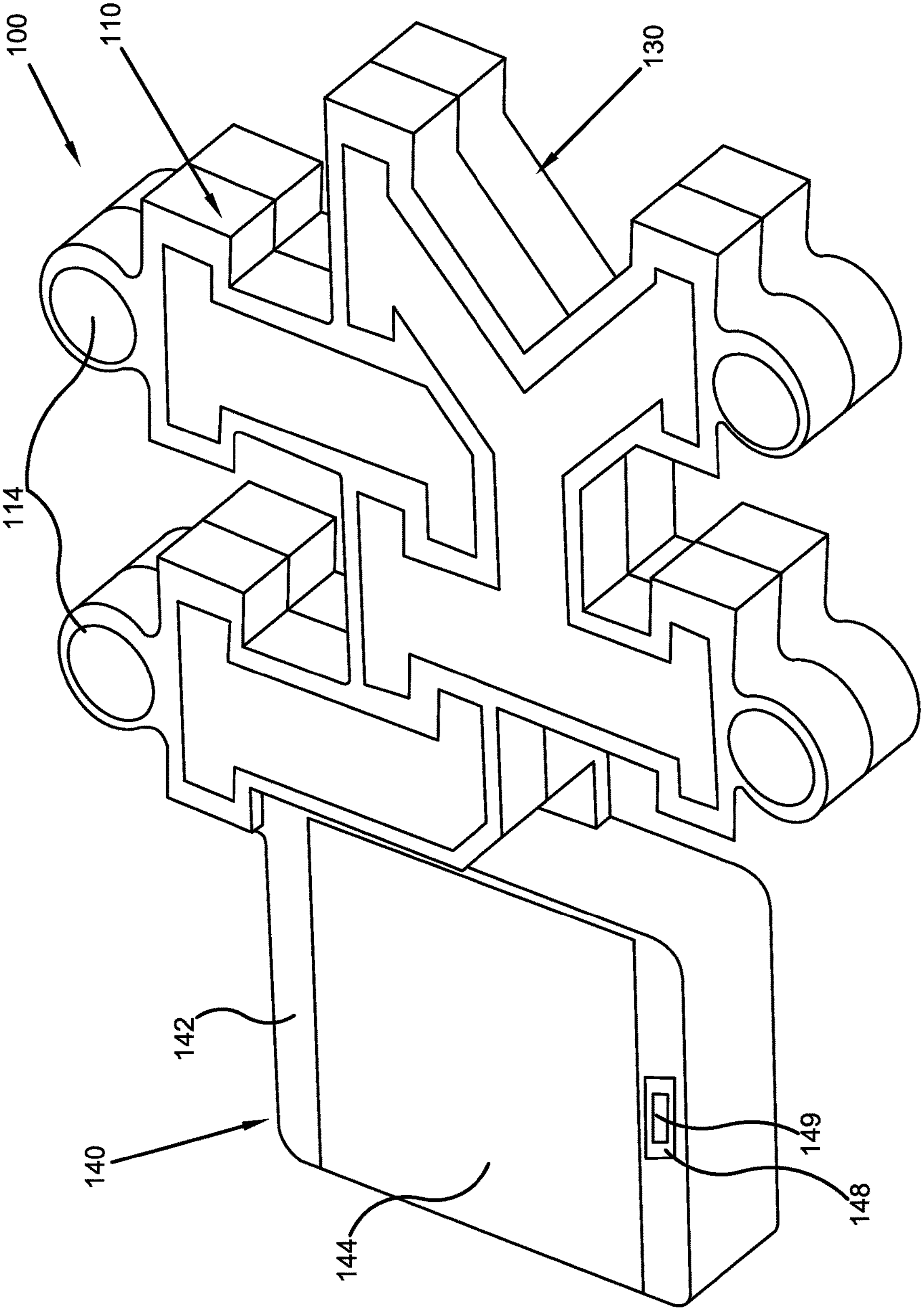
FIG. 1 illustrates a perspective view of one potential embodiment of an illuminated vehicle display device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that overcomes the inefficiencies and limitations of bumper stickers and decals for vehicles. There also exists a long-felt need in the art for an illuminated vehicle display device that is not susceptible to peeling and fading. Further, there exists a long-felt need in the art for an illuminated vehicle display device that is adequately illuminated at night. Finally, there is a long-felt need in the art for an illuminated vehicle display device that is relatively inexpensive to manufacture and that is both safe and easy to use.

The present invention, in one exemplary embodiment, is an illuminated vehicle display device primarily comprised of a top cover, a circuit board, a bottom cover and a housing having at least one solar panel. In the preferred embodiment, the top cover, bottom cover and housing are manufactured from a heat and cold resistant, rigid plastic. The top cover, bottom cover and house may also be any color in the art, as well as be transparent, semi-transparent or opaque. Furthermore, the top cover, bottom cover and housing may be comprised of a plurality of indicia such as, but not limited to, patterns, logos, emblems, images, symbols, designs, letters, numbers, words, characters, animals, advertisements, brands, etc., and/or may be shaped like said indicia. The top cover is comprised of a top surface (that may feature said indicia) and a side surface. The top surface is comprised of at least one fastener that allows the device to be easily secured to the interior of a vehicle window, or elsewhere along the vehicle.

The bottom cover is comprised of a bottom surface and a side surface, wherein the top cover may fit over the bottom cover or may fit within the bottom cover. The top cover may further be secured to the bottom cover via at least one fastener. In addition, at least one circuit board is located between the top cover and bottom cover, and is further comprised of at least one processor and at least one LED light. The at least one LED light illuminates through the top cover in order to illuminate the display device during use.

A housing is preferably located to the side of the top cover and the bottom cover. The top surface of the housing is further comprised of at least one solar panel that charges during daylight hours, and provides power to at least one battery to illuminate the LED and/or at least one sensor that is protected by a transparent housing. The sensor is in electrical communication with the processor, and can perceive the absence of light (i.e., night time) and/or motion. Once the absence of light and/or motion is detected, the sensor communicates with the processor to illuminate the LED light. When motion is continuously detected, the LED will remain illuminated. However, once motion is not detected for a user-specified period of time, the LED will no longer illuminate. This process can further be started (and subsequently automated) by pressing at least one button that is located on the bottom surface of the bottom cover and/or housing.

Accordingly, the illuminated vehicle display device of the present invention is particularly advantageous as it provides a device that overcomes the inefficiencies and limitations of bumper stickers and decals for vehicles and is not susceptible to peeling and fading. In addition, the device is adequately illuminated at night. In this manner, the illuminated vehicle display device overcomes the limitations of existing bumper stickers and decals known in the art.

Referring initially to the drawings, FIG. 1 illustrates a perspective view of one potential embodiment of an illuminated vehicle display device 100 of the present invention in accordance with the disclosed architecture. The device 100 is primarily comprised of a top cover 110, a circuit board 120, a bottom cover 130 and a housing 140 having at least one solar panel 144. In a preferred embodiment, the top cover 110, bottom cover 130 and housing 140 are manufactured from a temperature resistant and rigid plastic such as, but not limited to, an acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, recycled plastic, biodegradable plastic, etc. In differing embodiments, the top cover 110, bottom cover 130 and housing 140 may further be any color known in the art, and may be transparent, translucent, semi-transparent or opaque. In addition, the top cover 110, bottom cover 130 and housing 140 may be comprised of a plurality of indicia 150 such as, but not limited to, patterns, logos, emblems, images, symbols, designs, letters, numbers, words, characters, animals, advertisements, brands, etc.

In differing embodiments, the top cover 110, bottom cover 130 and housing 140 itself may be shaped like differing indicia 150 such as, but not limited to, patterns, logos, emblems, images, symbols, religious symbols, designs, letters, numbers, words, characters, animals, advertisements, brands, etc. For example, in one embodiment, the top cover 110 and bottom cover 130 are shaped like a college logo. In a differing embodiment, the top cover 110 and bottom cover 130 are generally rectangular, wherein the top surface 112 of the top cover 110 resembles a flag. The device 100 may further be comprised of a plurality of top covers 110 with top surfaces 112 that resemble different flags that can be interchangeably attached to the bottom cover 130 by a user.

Figure 2:
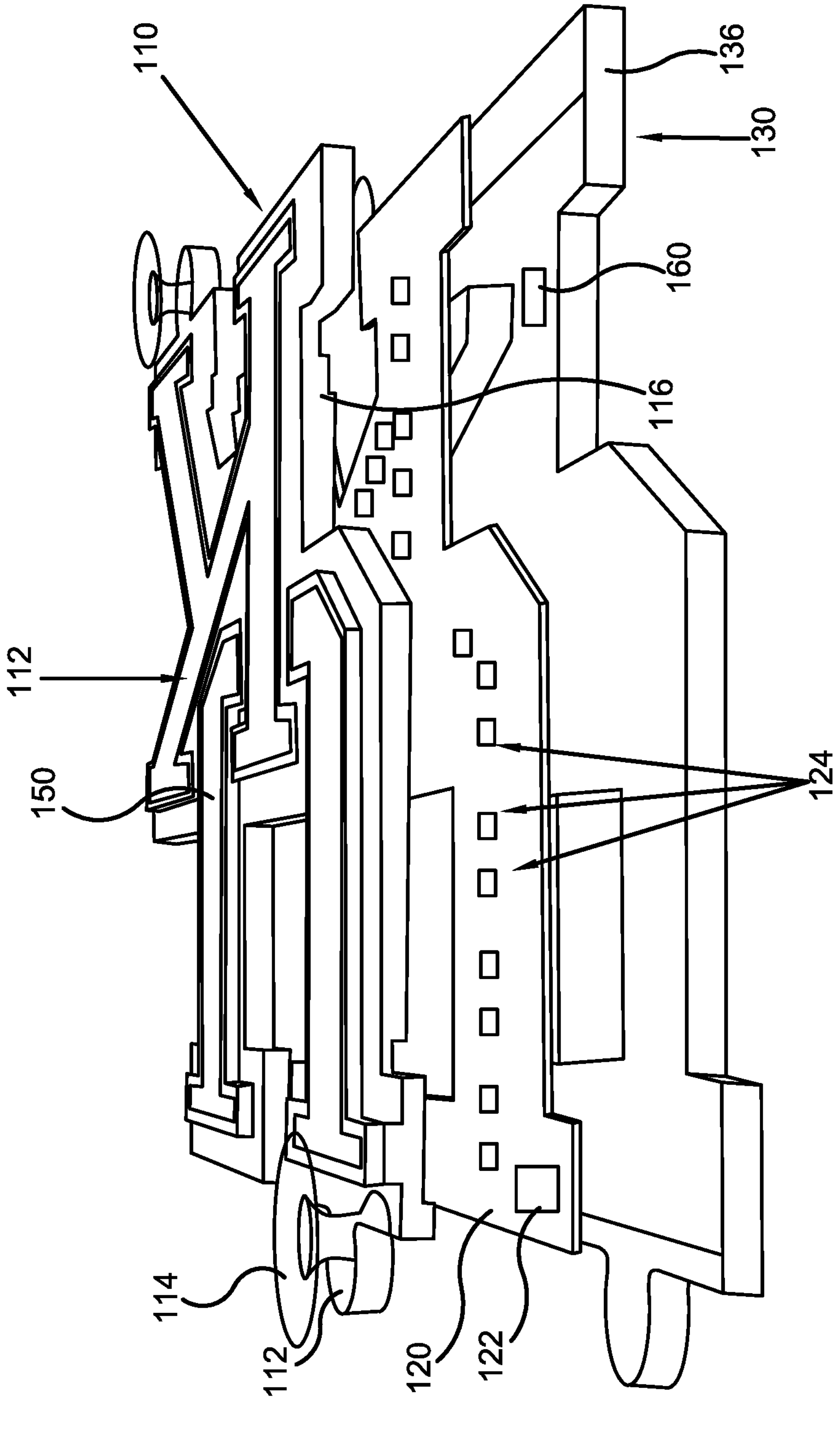
FIG. 2 illustrates an exploded view of one potential embodiment of an illuminated vehicle display device of the present invention in accordance with the disclosed architecture.

FIG. 2 illustrates an exploded view of one potential embodiment of an illuminated vehicle display device 100 of the present invention in accordance with the disclosed architecture. The top cover 110 is comprised of a top surface 112 that may feature said indicia 150, and a side surface 116. Similarly, the bottom cover 130 is comprised of a bottom surface 132 and a side surface 136. In differing embodiments, the top cover 110 may fit over the bottom cover 130, or may fit partially within the bottom cover 130. The top cover 110 may further be secured to the bottom cover 130 via at least one fastener 160 such as, but not limited to, an adhesive, friction fit, magnet, hook and loop, tongue and groove, etc., that may be located on any surface of the top cover 110 and/or any surface of the bottom cover 130. In one embodiment, the top cover 110 and bottom cover 130 may be inseparably attached or integrally formed during the manufacturing process. Additionally, at least one circuit board 120 is positioned between the top cover 110 and the bottom cover 130. The circuit board 120 is comprised of at least one processor 122 and at least one LED light 124. The LED light 124 illuminates through the top cover 110 in order to illuminate the display device 100 during use. In one embodiment, the LED light 124 is in the form of an LED board and/or an LED white board.

Figure 3:
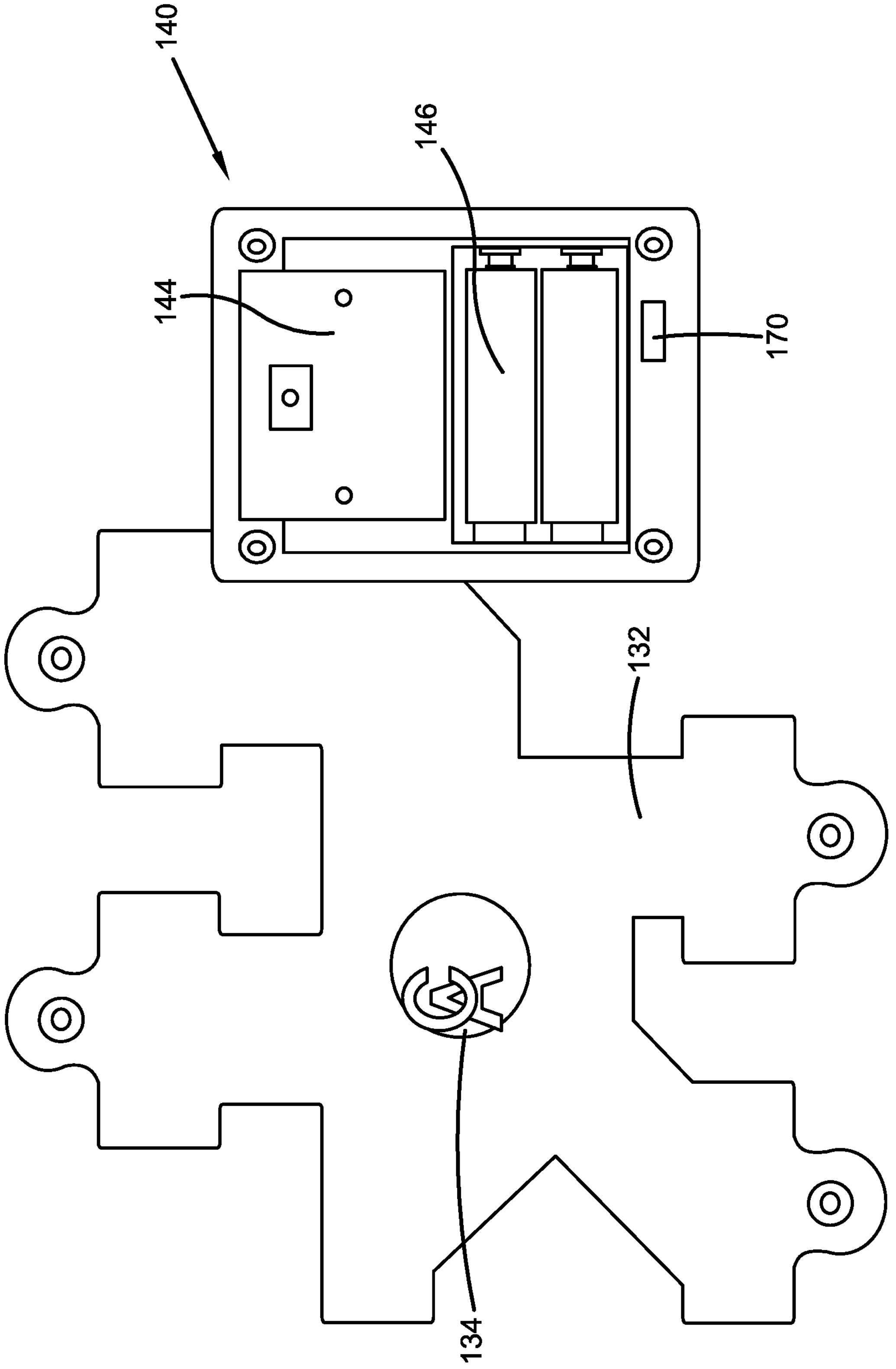
FIG. 3 illustrates a rear view of one potential embodiment of an illuminated vehicle display device of the present invention in accordance with the disclosed architecture.

The display device 100 is further comprised of a housing 140 that is preferably located to the side of the top cover 110 and/or the bottom cover 130. The housing 140 is preferably square or rectangular in shape, wherein the top surface 142 of the housing 140 is further comprised of at least one solar panel 144 that may be comprised of, but is not limited to, a monocrystalline silicon, polycrystalline silicon or a thin-film. The solar panel 144 is used to charge at least one battery 146 within the housing 140 during daylight hours to illuminate the LED light 124 upon demand or during low-light conditions. As best seen in FIG. 3, the battery 146 may be a disposable battery 146 or a rechargeable battery 146 in the form of an alkaline, nickel-cadmium, nickel-metal hydride battery 146, etc., such as any 3V-12 volts DC battery 146 or other conventional battery 146 such as A, AA, AAA, etc. that supply power to the display device 100. Throughout this specification the terms "battery" and "batteries" may be used interchangeably to refer to one or more wet or dry cells or batteries 146 of cells in which chemical energy is converted into electricity and used as a source of DC power. References to recharging or replacing batteries 146 may refer to recharging or replacing individual cells, individual batteries 146 of cells, or a package of multiple battery cells as is appropriate for any given battery 146 technology that may be used. Additionally, the battery 146 may be recharged by a USB port 170 such as, but not limited to: USB-A, USB-B, Micro-B, Micro-USB, Mini-USB, or USB-C.

The top surface 142 of the housing 140 is further comprised of at least one sensor 148 that is protected by a transparent housing 149. The sensor 148 is in electrical communication with the processor 122, and can perceive the absence of light (i.e., night time) and/or motion. Once the absence of light and/or motion is detected, the sensor 148 communicates with the processor 122 in order to illuminate the LED light 124. So long as motion is continuously detected, the LED 124 will remain illuminated. However, once motion is not detected for a specified period of time such as, but not limited to, 1 minute, 2 minutes, etc. as determined by an internal timer (not shown), the LED 124 will no longer illuminate. This process can further be started (and subsequently automated) by pressing at least one button 134 located on the bottom surface 132 of the bottom cover 130 and/or housing 140, or elsewhere.

The top surface 112 of the top cover 110 is further comprised of at least one fastener 114. In differing embodiments, the fastener 114 may be any fastener known in the art such as, but not limited to, hook and loop, adhesive, suction cup, etc. In this manner, the device 100 can be easily secured to the interior of a vehicle window, or anywhere else along the vehicle.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "illuminated vehicle display device" and "device" are interchangeable and refer to the illuminated vehicle display device 100 of the present invention.

Notwithstanding the forgoing, the illuminated vehicle display device 100 of the present invention and its various components can be of any suitable size and configuration as is known in the art without affecting the overall concept of the invention, provided that they accomplish the above-stated objectives. One of ordinary skill in the art will appreciate that the size, configuration and material of the illuminated vehicle display device 100 as shown in the FIGS. are for illustrative purposes only, and that many other sizes and shapes of the illuminated vehicle display device 100 are well within the scope of the present disclosure. Although the dimensions of the illuminated vehicle display device 100 are important design parameters for user convenience, the illuminated vehicle display device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An illuminated vehicle display device comprising:
a top cover;
a circuit board:
an LED;
a bottom cover comprising a fastener;
a button;
a housing further comprised of a solar panel, a battery and a sensor; and
an adhesive fastener on the top cover; and
wherein the top cover is secured to the bottom cover via the fastener.

2. The illuminated vehicle display device of claim 1, wherein the LED is powered by the battery.

3. The illuminated vehicle display device of claim 2, wherein the battery is powered by the solar panel.

4. The illuminated vehicle display device of claim 1, wherein the top cover is shaped like a pattern, a logo, an emblem, an image, a symbol, a religious symbol, a design, a letter, a number, a word, a character, an animal, an advertisement or a brand.

5. An illuminated vehicle display device comprising:
a top cover having a first fastener;
a bottom cover;
a button;
a processor;
a circuit board positioned between the top cover and the bottom cover, wherein the circuit board is comprised of an LED;
a housing;
a solar panel;
a battery;
a sensor; and
a second fastener; and
wherein the top cover is secured to the bottom cover via the second fastener.

6. The illuminated vehicle display device of claim 5, wherein the LED is powered by the battery.

7. The illuminated vehicle display device of claim 6, wherein the battery is powered by the solar panel.

8. An illuminated vehicle display device comprising:
a top cover having a first fastener;
a bottom cover having a button;
a processor;
a circuit board positioned between the top cover and the bottom cover, wherein the circuit board is comprised of an LED;
a housing;
a solar panel;
a battery;
a sensor; and
a second fastener; and
wherein the first fastener is a suction cup or an adhesive fastener.

9. The illuminated vehicle display device of claim 8, wherein the LED is powered by the battery.

10. The illuminated vehicle display device of claim 9, wherein the battery is powered by the solar panel.

11. The illuminated vehicle display device of claim 8, wherein the top cover is shaped like a flag.

12. The illuminated vehicle display device of claim 8, wherein the top cover is secured to the bottom cover via the second fastener.

13. The illuminated vehicle display device of claim 8 further comprised of a transparent housing that covers the sensor.

14. The illuminated vehicle display device of claim 8, wherein the sensor is in electrical communication with the processor.

15. The illuminated vehicle display device of claim 14, wherein the sensor detects the absence of a light and a motion.

16. The illuminated vehicle display device of claim 15, wherein the LED is illuminated when the sensor detects the absence of the light or the motion.

17. The illuminated vehicle display device of claim 16, wherein the LED ceases to be illuminated when the sensor does not detect the motion for a specific period of time.

18. The illuminated vehicle display device of claim 8, wherein the top cover is manufactured from a heat resistant plastic.

* * * * *